United States Patent
Pereira

(10) Patent No.: US 9,387,541 B2
(45) Date of Patent: Jul. 12, 2016

(54) DUAL-MOTOR DRILLING MACHINE WITH CONTROLLED FEED SPEED

(71) Applicant: SETI-TEC, Lognes (FR)

(72) Inventor: Sebastien Pereira, Paris (FR)

(73) Assignee: SETI-TEC, Lognes (FR)

(*) Notice: Subject to any disclaimer, the term of this patent is extended or adjusted under 35 U.S.C. 154(b) by 161 days.

(21) Appl. No.: 14/151,509

(22) Filed: Jan. 9, 2014

(65) Prior Publication Data

US 2014/0193217 A1    Jul. 10, 2014

(30) Foreign Application Priority Data

Jan. 9, 2013  (FR) .................................... 13 50196

(51) Int. Cl.
  *B23B 39/10* (2006.01)
  *B25F 5/00* (2006.01)
  *B23Q 5/32* (2006.01)

(52) U.S. Cl.
  CPC ................ *B23B 39/10* (2013.01); *B23Q 5/326* (2013.01); *B25F 5/001* (2013.01); *B23B 2260/07* (2013.01); *Y10T 408/65* (2015.01); *Y10T 408/66* (2015.01); *Y10T 408/675* (2015.01); *Y10T 408/73* (2015.01)

(58) Field of Classification Search
  CPC . Y10T 408/65; Y10T 408/66; Y10T 408/675; Y10T 408/73; B23B 39/10; B23B 2260/07; B23Q 5/326; B25F 5/001
  See application file for complete search history.

(56) References Cited

U.S. PATENT DOCUMENTS

| | | | | | |
|---|---|---|---|---|---|
| 1,284,894 | A | * | 11/1918 | Hill | ........................ B23B 39/162 |
| | | | | | 144/135.3 |
| 2,023,841 | A | * | 12/1935 | Kingsbury | .............. H02P 5/753 |
| | | | | | 408/11 |

(Continued)

FOREIGN PATENT DOCUMENTS

| FR | 2829952 A1 * | 3/2003 | ............. B23Q 5/326 |
|---|---|---|---|
| FR | 2881366 A1 * | 8/2006 | .............. F16D 7/044 |

(Continued)

OTHER PUBLICATIONS

French Search Report and Written Opinion dated Sep. 6, 2013 for corresponding French Application No. 1350196, filed on Jan. 9, 2013.

(Continued)

*Primary Examiner* — Eric A Gates
*Assistant Examiner* — Donte Brown
(74) *Attorney, Agent, or Firm* — David D. Brush; Westman, Champlin & Koehler, P.A.

(57) ABSTRACT

A controlled feed speed drilling machine includes an output shaft for driving a cutting tool in motion. The output shaft is connected to first and second motors by a transmission, which includes a rotationally driving ring and a tapped drive nut. The driving ring is rotatable along the longitudinal axis of the output shaft via the transmission and the first motor. The output shaft is rotationally linked to the driving ring and is mobile in translation relative to the driving ring along the longitudinal axis via the transmission and the second motor. The tapped drive nut rotates along the longitudinal axis relative to the output shaft via the transmission and the first motor. The translation speed $V_T$ of the output shaft along its longitudinal axis is equal to the product of the rotation frequency $F_R$ of the second motor and a constant k according to $V_T = k \cdot F_R$.

3 Claims, 2 Drawing Sheets

(56) References Cited

U.S. PATENT DOCUMENTS

| | | | | |
|---|---|---|---|---|
| 2,030,007 A * | 2/1936 | Kingsbury | B23Q 5/40 | 408/11 |
| 2,477,701 A * | 8/1949 | McCallum | B23Q 5/32 | 408/124 |
| 2,925,160 A * | 2/1960 | Mueller | B23Q 5/326 | 192/93 R |
| 2,950,490 A * | 8/1960 | Schwartz | B23G 1/16 | 408/133 |
| 3,126,766 A * | 3/1964 | Bent | B23Q 5/326 | 173/19 |
| 3,193,859 A * | 7/1965 | Pfister | B23G 3/005 | 408/124 |
| 3,368,634 A * | 2/1968 | Lear | E21B 6/00 | 173/105 |
| 3,455,207 A * | 7/1969 | Meinke | B23Q 1/28 | 408/129 |
| 3,487,729 A * | 1/1970 | Juhasz | B23Q 5/326 | 408/14 |
| 3,512,433 A * | 5/1970 | Juhasz | B23Q 5/326 | 408/129 |
| 3,512,434 A * | 5/1970 | Juhasz | B23Q 5/326 | 408/132 |
| 3,577,807 A * | 5/1971 | Alexander | B23B 45/04 | 408/17 |
| 3,583,822 A * | 6/1971 | Alexander | B23B 45/008 | 408/11 |
| 3,613,192 A * | 10/1971 | Tunabe | B23B 29/03478 | 29/26 R |
| 3,640,147 A * | 2/1972 | Fantoni | B23G 1/16 | 408/137 |
| 3,706,506 A * | 12/1972 | Dorak | B23G 1/04 | 408/130 |
| 3,767,313 A * | 10/1973 | Bohoroquez | B23B 45/008 | 408/132 |
| 3,803,927 A * | 4/1974 | Lawler | B23Q 5/326 | 408/135 |
| 3,803,928 A * | 4/1974 | Konkal | B23Q 5/326 | 74/665 GA |
| 3,804,544 A * | 4/1974 | Adams | A61B 17/16 | 173/146 |
| 3,804,545 A * | 4/1974 | Chistov | B23B 51/044 | 173/145 |
| 3,977,806 A * | 8/1976 | Kinoshita | B23Q 5/20 | 192/69.91 |
| 3,981,606 A * | 9/1976 | Nashold | B23B 43/00 | 408/124 |
| 4,083,646 A * | 4/1978 | Vindez | B23Q 5/326 | 408/133 |
| 4,097,177 A * | 6/1978 | Close | B23Q 5/326 | 173/145 |
| 4,111,590 A * | 9/1978 | Burkart | B23Q 1/70 | 408/130 |
| 4,124,327 A * | 11/1978 | Yoshida | B23Q 1/0009 | 408/124 |
| 4,449,866 A * | 5/1984 | Lohneis | B23Q 5/14 | 408/124 |
| 4,480,700 A * | 11/1984 | Krieger | B23B 41/00 | 173/145 |
| 4,591,299 A * | 5/1986 | Eckman | B23Q 5/326 | 173/154 |
| 4,688,970 A * | 8/1987 | Eckman | G05B 19/4163 | 408/10 |
| 4,850,753 A * | 7/1989 | Dudden | B23Q 5/326 | 173/19 |
| 4,958,967 A * | 9/1990 | Adachi | B23Q 1/70 | 408/129 |
| 5,022,800 A * | 6/1991 | Vindez | B23Q 5/326 | 173/19 |
| 5,054,968 A * | 10/1991 | Eckman | B23B 49/02 | 408/129 |
| 5,143,161 A * | 9/1992 | Vindez | B23G 1/46 | 173/145 |
| 5,351,797 A * | 10/1994 | Lawson | B23Q 5/326 | 173/19 |
| 7,970,317 B2 * | 6/2011 | Seto | G03G 15/5008 | 399/167 |
| 8,376,668 B2 * | 2/2013 | Bruerton | B23Q 5/326 | 408/138 |
| 8,388,276 B2 * | 3/2013 | Jaillon | B23B 35/005 | 408/1 R |
| 8,388,282 B2 * | 3/2013 | Galand | B23Q 5/326 | 408/57 |
| 8,469,641 B2 * | 6/2013 | Jaillon | B23B 47/34 | 408/132 |
| 8,522,941 B1 * | 9/2013 | Eldessouky | B23Q 5/326 | 192/69.81 |
| 8,955,852 B2 * | 2/2015 | Hiestand | B23B 31/16229 | 279/125 |
| 2013/0051946 A1 * | 2/2013 | Peigne | B23B 47/34 | 408/1 R |
| 2014/0169895 A1 * | 6/2014 | Luebbering | B23B 47/34 | 408/17 |
| 2014/0238711 A1 * | 8/2014 | Myhill | B25F 5/001 | 173/1 |
| 2014/0290974 A1 * | 10/2014 | Eriksson | B23Q 5/326 | 173/141 |
| 2014/0318290 A1 * | 10/2014 | Eriksson | B23Q 5/326 | 74/89.23 |

FOREIGN PATENT DOCUMENTS

| | | | | |
|---|---|---|---|---|
| FR | 2918592 A1 * | 1/2009 | | B23Q 5/326 |
| FR | 3000694 A1 * | 7/2014 | | B23Q 5/147 |
| GB | 2489018 A * | 9/2012 | | B23Q 5/326 |

OTHER PUBLICATIONS

English translation of the Written Opinion dated Sep. 6, 2013 for corresponding French Application No. 1350196, filed on Jan. 9, 2013.

* cited by examiner

DUAL-MOTOR DRILLING MACHINE WITH CONTROLLED FEED SPEED

1. FIELD OF THE INVENTION

The field of the invention is that of the designing and manufacture of drilling tools more commonly called drilling machines.

More specifically, the invention pertains to a drilling tool or drilling machine with a controlled feed speed.

2. PRIOR ART

There are known drilling machines whose output shaft, which is intended for driving a cutting tool such as a drill in motion, can be driven simultaneously in rotation and in translation along a same axis in order to carry out a drilling operation.

The patent application FR-A1-2 881 366 describes a drilling machine of this kind. This drilling machine has a single motor connected to the output shaft by a transmission intended for driving the output shaft in translation and in rotation along a same axis. The automatic feed mechanism described in this document does not enable the management of both the rotation frequency and the feed speed of the drill in a drilling action because only one motor is used to carry out both these functions. Drilling machines of this type, where the feed speed of the output shaft is directly related to the rotation frequency, are called automatic feed drilling machines.

For some years now, the aeronautical industry has been optimizing aircraft performance by using structures consisting of several materials of different kinds such as aluminium alloys associated with carbon and titanium fibers. These materials can be used in the form of superimposed panels.

For optimal drilling, these different materials require different conditions of rotational frequency and/or feed of a cutting tool such as a drill. For example, the cutting speed for cutting an aluminium alloy can be five times greater than the speed for titanium.

However, automatic feed drilling machines do not enable the rotation frequencies and the feed speed of the cutting tool to be modified at will to enable the machining of materials having different cutting conditions since do they not offer the possibility of modifying the rotation on the one hand and the feed speed on the other.

Drills have therefore been developed enabling the rotational frequency and/or the feed speed to be adapted to the materials machined to enable optimal drilling of a composite panel formed by several layers of different materials. These are drilling machines with controlled feed speeds.

These controlled feed speed drilling machines are used to adjust firstly the rotation frequency and secondly the feed speed of their output shaft.

To this end, these drilling machines have a first motor that is implemented to drive the drill in a rotational motion while a second engine is implemented to drive the drill in a linear feeding motion. The output shaft has a grooved portion with which a rotationally driving ring cooperates. This ring is constituted by a first pinion with an internal shape complementary to that of the grooved portion of the shaft. The output shaft also has a threaded portion with which there cooperates a drive nut consisting of a second pinion with an internal shape complementary to that of the threaded portion of the shaft. The first pinion is connected to the shaft of a rotationally driving motor via a first transmission chain while the second pinion is connected to the shaft of a feed motor via a second transmission chain. These two transmission chains are completely independent of each other since they have no mechanical component in common.

During a drilling operation, the two motors are simultaneously implemented to drive the output shaft and the tool that is fixedly attached to it in both rotation and translation. In order to adapt the cutting conditions to the machined materials, it is possible to modify the rotation frequency of the drill by modifying the rotation frequency of the rotationally driving motor and to modify the feed speed of the drill in modifying the rotation frequency of the feed motor. The cutting tool then drills the part to be machined.

Means for the automatic return of the cutting tool are implemented so that this tool is removed from the drill hole made and brought back to an initial position at the end of the drilling cycle.

The implementing of currently used drilling machines with controlled feed speed provides for precise drilling operations. These controlled feed speed drilling machines can however be further improved.

3. DRAWBACKS OF THE PRIOR ART

The feed speed of the drill is proportional to the difference between the rotation frequency of the drive nut and that of the driving ring. Since the two transmission chains are completely independent, the difference between the rotation frequency of the drive nut and that of the driving ring is proportional to the difference between the rotation frequency of the rotationally driving motor and the rotation frequency of the feed motor.

In other words, the feed speed of the drill depends on the difference between the rotation frequency of the rotationally driving motor and the rotation frequency of the feed motor. They are therefore related both to the rotation frequency of the rotational drive motor and that of the feed motor.

This type of architecture using a drive nut to generate the feeding of the output shaft and a driving ring to generate its rotation with completely independent transmission chains therefore requires the conjugation of the rotation frequencies of the feed and rotation motors to obtain a given feed speed.

Feed speed is a major parameter for ensuring that the drilling operations are carried out optimally. Indeed, an excessive feed speed can lead to poor surface condition of the hole or a deformation of the structure to be drilled. However, an excessively high low speed can cause the drill to work at a level below that of the minimum chip thickness and cause work hardening and heating during the drilling operation. Deterioration can then be seen in the machine parts and/or cutting tools.

Since controlled feed speed drilling machines can be used for drilling operations on costly elements such as for example aircraft structures, their deterioration as a result of poor control of the drilling operations can have non-negligible economic consequences.

In order to limit such a risk, the feed speed of the output shaft must be managed with high reliability. However, since the feed speed of the output shaft of prior art controlled feed speed drilling machines is related both to the rotation frequency of the rotationally driving motor and that of the feed motor, the management of the rotation frequencies of the motors in the drilling program is relatively complicated. This tends to reduce reliability and increase the risk that drilling operations will not be obtained optimally.

4. SUMMARY OF THE INVENTION

These goals and others that shall appear here below are achieved by means of a controlled feed speed drilling machine comprising motor means and an output shaft intended for driving a cutting tool in motion, said motor means and said output shaft being connected by transmission means comprising:

a rotationally driving ring capable of being driven in rotation along the longitudinal axis of said output shaft via said transmission means and said motor means, said output shaft being rotationally linked to said driving ring and being mobile in translation relative to this driving ring along said longitudinal axis, and a tapped drive nut cooperating with a threaded portion of a complementary shape made on said driving shaft, said drive nut being capable of being driven in rotation along said longitudinal axis relative to said output shaft via said transmission means and said motor means; said motor means comprising:

a first motor enabling said output shaft to be driven rotationally about its longitudinal axis via said transmission means, and a second motor enabling said output shaft to be driven in translation along its longitudinal axis via said transmission means.

Said transmission means are configured in such a way that the translation speed $V_T$ of said output shaft along its longitudinal axis is equal to the product of the rotation frequency $F_R$ of said second motor and a constant k according to the formula $V_T = k \cdot F_R$.

According to the invention, said transmission comprises a
  transmission assembly comprising an epicyclic train, said epicyclic train comprising:
  a sun gear connected to said second motor;
  an internal ring (connected to a first pinion;
  planet gears meshing with said sun gear and with said internal ring;
  a planet carrier;
said planet carrier being connected to a third pinion, said first pinion meshing with a second pinion fixedly attached to said driving ring and said third pinion meshing with a fourth pinion fixedly attached to said drive nut, or vice versa,
the reduction ratio of said epicyclic train, the reduction ratio between said first pinion and said second pinion or said fourth pinion, and the reduction ratio between said third pinion and said fourth pinion or said second pinion being determined in such a way that the difference between the rotation frequency $F_N$ of said drive nut and the rotation frequency $F_B$ of said driving ring is equal to the product of the rotation frequency $F_R$ of said second motor and a constant k according to the formula $F_N - F_B = k \cdot F_R$.

Thus, the invention relies on a wholly original approach in which transmission means are implemented in a controlled feed speed drilling machine comprising a motor for rotationally driving the output shaft into rotation and a feed motor for driving this output shaft in translation, the means of transmission being planned so that the translation speed of the output shaft depends solely on the rotation frequency of the feed motor.

Thus, the feed speed of the output shaft depends solely on the frequency of rotation of the feed motor but is completely independent on the frequency of rotation of the rotationally driving motor. The management of the feed of the output shaft therefore depends solely on the management of the frequency of rotation of the feed motor.

The technique according to the invention makes the management of the output shaft speed feed more reliable and reduces risks (in terms of deterioration of machined parts and/or cutting tools) related to poor control of this feed speed.

The use of a system using a driving ring and drive nut results in a drilling machine with a small distance from the centre, i.e. distance between the axis of the shaft of the drilling machine and the edge of the housing of this machine.

According to a preferred characteristic, said transmission means comprise a first transmission chain linking said first motor to said output shaft and a second transmission chain linking said second motor to said output shaft, said first and second transmission chains being dependent on each other.

It is thus possible to size the transmission chains in such a way that the translation speed $V_T$ of said output shaft along its longitudinal axis is equal to the product of the rotation frequency $F_R$ of said second motor and a constant k according to the formula $V_T = k \cdot F_R$.

According to a preferred characteristic, said transmission means are configured so that the difference between the rotation frequency $F_N$ of said drive nut and the rotation frequency $F_B$ of said driving ring is equal to the product of the rotation frequency $F_R$ of said motor and a constant k according to the formula $F_N - F_B = k \cdot F_R$.

Thus this feed speed of the output shaft can be modified by acting only on the rotation frequency of the feed motor.

In this case, said transmission means preferably comprise a transmission assembly having a first input connected to said first motor, a second input connected to said second motor and an output constituted by said drive nut, said transmission assembly being configured so that the difference between the rotation frequency $F_N$ of said drive nut and the rotation frequency $F_B$ of said driving ring is equal to the product of the rotation frequency $F_R$ of said second motor and a constant k according to the formula $F_N - F_B = k \cdot F_R$.

Advantageously, said first pinion could be connected to said first motor by means of a ring-and-pinion unit.

The drilling machine is then of an angle transmission type.

Advantageously, the drilling machine comprises a motor shaft to which said sun gear is rotationally linked, the shaft of said second motor being linked to said motor shaft by means of a worm screw.

This implementation helps improve the compactness of the drilling machine.

5. LIST OF FIGURES

Other features and advantageous of the invention shall appear more clearly from the following description of a preferred embodiment, given by way of a simple illustratory and non-exhaustive example and from the appended drawings, of which:

6. DESCRIPTION OF ONE EMBODIMENT OF THE INVENTION

6.1 General Principle of the Invention

The general principle of the invention relies on the implementation in a drilling machine with controlled feed speed, comprising a rotationally driving motor for rotationally driving the output shaft and a feed motor enabling the driving in translation of this shaft, means for transmission planned so that the translation speed of the output shaft depends solely on the frequency of rotation of the feed motor and is completely independent of the frequency of rotation of the motor for rotationally driving the output shaft.

The reliability with which the feed speed of the output shaft is managed is therefore improved by the implementation of the invention which therefore plays a part in reducing the risks (deterioration of the machined pieces and/or of the cutting tools) related to poor management of the feed.

Figure 1:
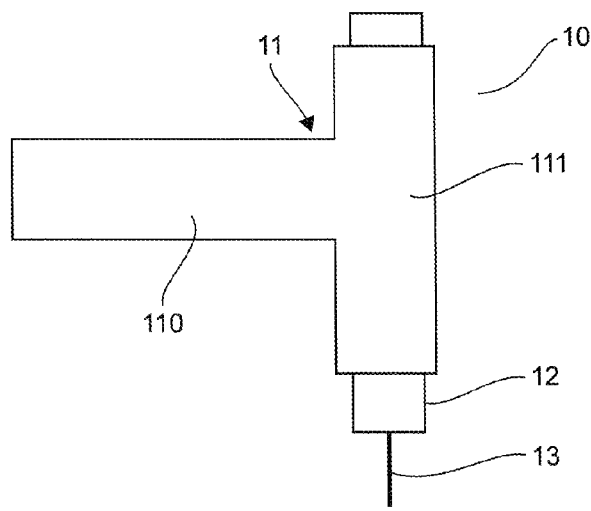
FIG. 1 illustrates a side view of an example of a drilling machine with controlled feed speed according to the invention.
Figure 2:
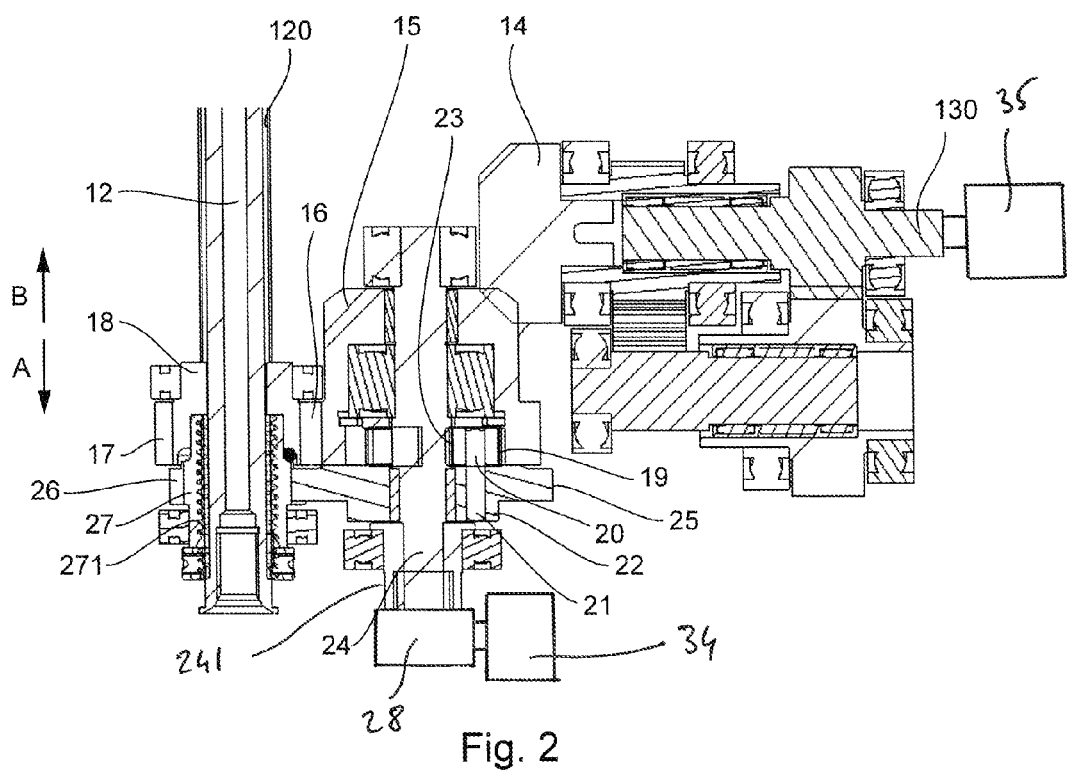
FIG. 2 illustrates a partial view in section along a longitudinal plane of the drilling machine illustrated in FIG. 1.
Figure 3:
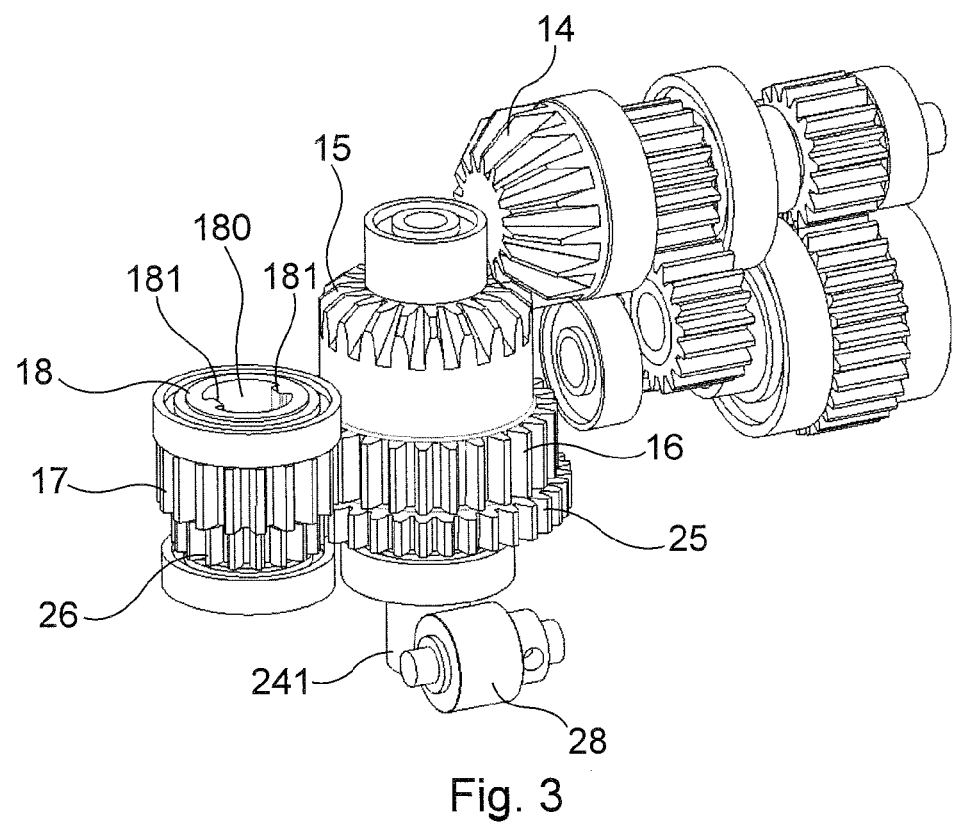
FIG. 3 illustrates a partial view in perspective of the transmission of the drilling machine illustrated in FIG. 2.

6.2 Example of an Embodiment of a Drilling Machine According to the Invention 6.2.1 Architecture Referring now to FIGS. 1 to 3, we present an example of a drilling machine with controlled feed speed according to the invention.

Thus, as shown in FIG. 1, such a drilling machine with controlled feed speed 10 comprises a housing 11.

The housing 11 comprises a first housing portion 110 and a second housing portion 111 which extend substantially perpendicularly to each other.

The portion 111 houses an output shaft 12 mounted so as to be mobile in rotation and in translation along the longitudinal axis of the portion 111.

Means for fixedly attaching a tool 13, for example a drill, are placed at the end of the output shaft 12. These means for fixedly attaching can for example comprise a drill clamp.

FIG. 2 illustrates a partial view in section, along a plane passing through the longitudinal axes of the first housing portion 110, and second housing portion 111, of a part of the drilling machine 10 of FIG. 1 from which the housing 11 has been withdrawn.

This drilling machine 10 has motor means connected to the output shaft 12 via transmission means.

The motor means comprise two motors: a rotationally driving motor 35 and a feed motor 34. In this embodiment, these motors are electric. They could for example be permanent-magnet synchronous electric motors powered by inverters themselves connected to a battery or to the mains supply.

The shaft of the rotationally driving motor is fixedly attached to a shaft 130 itself fixedly attached to a first bevel gear 14. This first bevel gear 14 meshes with the second bevel gear 15. This bevel gear 15 is rotationally linked to a first spur wheel (or pinion) 16. This first pinion 16 engages with a second pinion 17 which is rotationally linked to a rotationally driving ring 18.

The rotationally driving ring 18 is crossed by a central drill hole 180 made along its longitudinal axis. Longitudinal ribs 181 project into the drill hole 180.

The output shaft 12 has a portion with longitudinal grooves having a shape complementary to that of the ribs 181 of the driving ring 18.

The driving ring 18 is thus mounted so as to be mobile in translation along the longitudinal axis of the output shaft 12 while at the same time being rotationally linked to it.

The first pinion 16 is rotationally linked with the internal ring 19 of an epicyclic train.

This internal ring 19 meshes with the planet gears 20 which are mounted so as to be rotationally mobile on pins 21 fixedly attached to a planet carrier 22.

The planet gears 20 mesh with a sun gear 23 that is rotationally linked with a motor shaft 24. The motor shaft 24 is mounted so as to be rotationally mobile along an axis parallel to the longitudinal axis of the output shaft 12.

The planet carrier 22 is rotationally linked with a third pinion 25 which meshes with a fourth pinion 26 rotationally linked to a translational drive nut 27.

The drive nut 27 comprises an internal tapping 271 with a shape complementary to a threaded portion prepared on the surface of the output shaft 12.

One of the ends of the output shaft 24 has a worm screw 241 which cooperates with a fifth pinion 28 rotationally linked with the shaft of the feed motor.

The pinion 16, the pinion 17, the ring 19, the planet gears 20, the pins 21, the planet carrier 22, the sun gear 23, the motor shaft 24, the pinion 25, the pinion 26 constitute a transmission assembly, of which the pinion 17 is the first input. The motor shaft 24 is a second input and the pinion 26 is the output. Thus, if the motor shaft is kept immobile, a rotation of the driving ring gives rise to a rotation of the drive nut. A rotation of the driving ring and of the motor shaft drives a rotation of the drive nut.

This transmission assembly is configured to rotationally drive the drive nut 27 at a frequency identical to that of the driving ring 18 whatever the rotation frequency of the driving motor in rotation and so long as the rotation frequency of the feed motor is zero.

In other words, this transmission assembly is configured so that the difference between the rotation frequency $N_{27}$ or $F_N$ of the drive nut 27 and the rotation frequency $N_{18}$ or $F_B$ of the driving ring 18 is proportional only to the rotation frequency $N_{24}$ or $F_R$ of the feed motor according to the formula $N_{27}-N_{18}=K \cdot N_{24}$ or $F_N-F_B=K \cdot F_R$, K being a constant. The feed speed $V_T$ of the output shaft 12 is therefore dependent only on the rotation frequency $F_R$ of the feed motor according to the formula $V_T=K \cdot F_R$, K being a constant.

This transmission assembly comprises two transmission chains. The first transmission chain links the driving motor rotationally to the driving ring 18. In this embodiment, it comprises the pinions 14, 15, 16 and 17. The second transmission chain links the feed motor to the drive nut 27. This transmission chain comprises two inputs, namely the feed motor and the ring 19, and one output, namely the drive nut 27. This second transmission chain comprises the motor shaft 24, the sun gear 23, the planet gears 20, the ring 19, the planet carrier 22, the pinion 25 and the pinion 26 to which the drive nut 27 is linked.

These two transmission chains are dependent on each other. Indeed, they share at least certain components, i.e. certain components of the first transmission chain are also part of the second transmission chain. As it happens, the ring 19 and the pinion 16 are borne by the same part. This dependency between these two transmission chains respectively connected to the rotationally driving motor and to the feed motor makes it possible, by acting appropriately on the reduction ratio of the different gear trains forming these transmission chains, to make the feed speed of the output shaft depend only on the rotation frequency of the feed motor and not on the frequency of the rotationally driving motor.

More specifically, the reduction ratio $R_1$ of the epicyclic train, the reduction ratio $R_2$ between said first pinion 16 and said second pinion 17 fixedly attached to the driving ring 18 and the reduction ratio $R_3$ between the third pinion 25 and the fourth pinion 26 fixedly attached to the drive nut 27 are determined in such a way that the difference between the rotation frequency of the drive nut 27 and that of the driving ring 18 is proportional only to the rotation frequency of the feed motor.

The values of $R_1$, $R_2$ and $R_3$ are the following:

$$R_1=(N_{24}-N_{15})/(N_{22}-N_{15})=1+(Z_{19}/Z_{23})(*)$$

$$R_2=N_{18}/N_{15}=Z_{16}/Z_{17}$$

$$R_3=N_{27}/N_{22}=Z_{25}/Z_{26}$$

N and Z are respectively the rotation frequency and the number of teeth of the elements indicated as indices.

It is desired that the feed of the output shaft 12 should be proportional only to the difference between the rotation frequency of the drive nut 27 and that of the driving ring 18. In other words:

$$N_{27} - N_{18} = K \cdot N_{24}$$

K being a constant and $N_{24}$ being proportional to the rotation frequency of the feed motor inasmuch as the shaft 24 is connected to it.

$$N_{27} - N_{18} = (N_{22} \cdot Z_{25}/Z_{26}) - (N_{15} \cdot Z_{16}/Z_{17})$$

Given the equation (*), we obtain:

$$(N_{24} - N_{15}) = R_1 (N_{22} - N_{15})$$

$$N_{15} = (N_{24} - R_1 N_{22})/(1 - R_1)$$

This leads to:

$$N_{27} - N_{18} = (N_{22} \cdot Z_{25}/Z_{26}) - ((N_{24} - R_1 N_{22})/(1 - R_1) \cdot Z_{16}/Z_{17})$$

$$N_{27} - N_{18} = (N_{22} \cdot Z_{25}/Z_{26}) + (R_1 N_{22}/(1 - R_1) \cdot Z_{16}/Z_{17}) - (N_{24}/(1 - R_1) \cdot Z_{16}/Z_{17})$$

If it is desired that:

$$N_{27} - N_{18} = K \cdot N_{24}$$

Then:

$$(Z_{25}/Z_{26}) + (R_1/(1 - R_1) \cdot Z_{16}/Z_{17}) = 0$$

Giving:

$$(R_1 - 1) \cdot Z_{25} \cdot Z_{17} = R_1 \cdot Z_{16} \cdot Z_{26}$$

with $R_1 = 1 + Z_{19}/Z_{23}$

In selecting the number of teeth in this way, the feed of the output shaft 12 along its longitudinal axis will be proportional only to the rotation speed of the feed motor.

Thus, the translation of the output shaft 12 along its longitudinal axis is zero when the rotation frequency of the feed motor is zero, and whether or not the rotation frequency of the rotationally driving motor is zero, because the driving ring 18 and the drive nut 27 have the same rotation frequency. By contrast, when the translation motor or feed motor is driven, the rotation frequency of the driving ring 18 and that of the drive nut 27 are different so that the output shaft 12 gets translated along its longitudinal axis in one sense or in the other according to the sense of rotation of the feed motor.

The result of this is that the feeding of the output shaft 12 is linked only to the rotation frequency of the feed motor and not to that of the rotationally driving motor.

The drilling machine comprises command means which can be actuated to launch a drilling cycle. It also has control means used to program the parameters of the drilling operations carried out with the drilling machine, especially the drilling depth, the cutting speed and the feed speed. The cutting speed and the feed speed could be managed independently according to a drilling strategy that including taking account of the measured depth of the drilling, and/or the cutting force and/or the torque in order to detect the different transitions in the drilling of structures included materials of different natures.

The drilling machine comprises means of automatic inversion of the sense of translation of the output shaft when it reaches a predetermined threshold value representing the drilling depth in order to enable the drill to be retracted from the hole at the end of the drilling operation.

6.2.2 Operation

In order to achieve a drilling operation, a cutting tool such as a drill is fixedly attached to the end of the output shaft 12 by means of a drill clamp.

The drilling parameters are registered in the programming means of the drilling machine.

The operator activates the actuation means to launch a drilling cycle.

The rotationally driving motor is implemented and rotates in the counter-clockwise sense as seen from the rear of the motor. It drives the first bevel gear 14 rotationally in the counter-clockwise sense. The first bevel gear 14 drives a second bevel gear 15 in the counter-clockwise sense as seen from the top of the drilling machine.

The first pinion 16 which is fixedly attached to the pinion 15 also rotates in the counter-clockwise sense and drives the second pinion 17 in the clockwise sense. The driving ring 18 which is fixedly attached to the pinion 17 also rotates in the clockwise sense and drives the output shaft 12 rotationally in the clockwise sense.

The ring 19, fixedly attached to the pinion 16, rotates in the counter-clockwise sense. The planet gears 20 rotate in the counter-clockwise sense. The feed motor is off. The motor shaft 24 is therefore immobile as is the sun gear 23 which is fixedly attached thereto. The planet carrier 22 then rotates in the counter-clockwise sense. The pinion 25, which is fixedly attached to the planet carrier 22, also rotates in the counter-clockwise sense and drives the pinion 26 in the clockwise sense. The drive nut 27 then rotates in the clockwise sense at the same frequency as the driving ring 18 so much so that the output shaft 12 rotates in the clockwise sense about its longitudinal axis while at the same time undergoing no translation along this axis.

The feed motor is then implemented so that the motor shaft 24 is driven rotationally in the counter-clockwise sense via the pinion 28 and the worm screw 241 as seen from the end of the output shaft 12 opposite that intended to cooperate with the drill. This tends to accelerate the rotation frequency of the planet carrier 22 and the pinion 25 in the counter-clockwise sense as well as the rotation frequencies of the pinion 26 and of the drive nut 27 in the clockwise sense.

The rotation of the driving nut relative to the driving ring is therefore in the clockwise sense. Since the threaded portion of the output shaft 12 is a left-hand thread, the drive nut drives the output shaft 12 in translation in the drilling sense of the arrow A. Depending on the drilling strategy implemented, the rotation frequency is modulated to meet the requirements of the materials encountered by the drill.

As soon as the means for automatically inverting the sense of translation of the output shaft detect that the linear shifting of the output shaft has reached a predetermined threshold value, they invert the sense of rotation of the feed motor so that the output shaft gets translated along the arrow B. The drill is then retracted from the hole at the end of the drilling.

6.2.3 Variant

In one variant, the pinion 16 could be directly driven in rotation by the rotationally driving motor without any ring-and-pinion unit being implemented between the shaft of this motor and the pinion 16.

In other variants, the pinion 25 could mesh with the pinion 17 and the pinion 16 could mesh with the pinion 26. In this case, a ring-and-pinion unit may or may not be implemented between the shaft of the rotation motor and the pinion 25.

The previous computations of reduction do not apply to these variants.

The shaft of the feed motor could be directly connected to the motor shaft without any worm screw type of device.

6.3 Advantages

In a controlled feed speed drilling machine according to the invention, the feed speed of the output shaft is related solely to the rotation frequency of the feed motor and not to the combination of the rotation frequency of the rotationally driving motor and the rotation frequency of the feed motor.

The result of this is that the management of the feed of the output shaft can be generated optimally with great reliability. Thus, this limits the risk that the feed will be poorly controlled during a drilling operation and the risk of damage to the parts to be machined and/or cutting tools.

An exemplary embodiment thus provides a controlled feed speed drilling machine which makes it possible to optimize the drilling operations and limit the risks of deterioration of the machined parts and/or cutting tools.

In particular, an embodiment provides a drilling machine of this kind which makes it possible to achieve reliable control over the feed speed of the output shaft.

An embodiment implements a drilling machine of this kind that is reliable and/or simple in design and or robust.

The invention claimed is:

1. A controlled feed speed drilling machine comprising:
   first and second motors;
   an output shaft for driving a cutting tool in motion
   a transmission, which connects said first and second motors and said output shaft, the transmission comprising:
   a rotationally driving ring capable of being driven in rotation along the longitudinal axis of said output shaft via said transmission and said first motor, said output shaft being rotationally linked to said driving ring and being mobile in translation relative to said driving ring along said longitudinal axis, and
   a tapped drive nut cooperating with a threaded portion of a complementary shape made on said output shaft, said drive nut being capable of being driven in rotation along said longitudinal axis relative to said output shaft via said transmission and said second motor; wherein:
   said first motor enables said output shaft to be driven rotationally about its longitudinal axis via said transmission, and
   said second motor enables said output shaft to be driven in translation along its longitudinal axis via said transmission,
   said transmission is configured in such a way that a translation speed $V_T$ of said output shaft along its longitudinal axis is equal to the product of a rotation frequency $F_R$ of said second motor and a constant k according to the formula $V_T = k \cdot F_R$,
   said transmission further comprises a transmission assembly comprising a single epicyclic train, said epicyclic train comprising:
   a sun gear connected to said second motor;
   an internal ring rotationally connected to a first pinion;
   planet gears meshing with said sun gear and with said internal ring;
   a planet carrier;
   said planet carrier being rotationally connected to a third pinion, said first pinion meshing with a second pinion fixedly attached to said driving ring and said third pinion meshing with a fourth pinion fixedly attached to said drive nut, or vice versa,
   a reduction ratio of said epicyclic train, the reduction ratio between said first pinion and said second pinion or said fourth pinion, and the reduction ratio between said third pinion and said fourth pinion or said second pinion being determined in such a way that the difference between the rotation frequency $F_N$ of said drive nut and the rotation frequency $F_B$ of said driving ring is equal to the product of the rotation frequency $F_R$ of said second motor and a constant k according to the formula $F_N - F_B = k \cdot F_R$.

2. The controlled feed speed drilling machine according to claim 1, wherein said first pinion is connected to said first motor by a ring-and-pinion unit.

3. The controlled feed speed drilling machine according to claim 1, further comprising a motor shaft to which said sun gear is rotationally linked, a shaft of said second motor being linked to said motor shaft by a worm.

* * * * *